(No Model.)
O. P. JERVIS.
WHEEL FASTENER AND AXLE BOX.
No. 470,409. Patented Mar. 8, 1892.
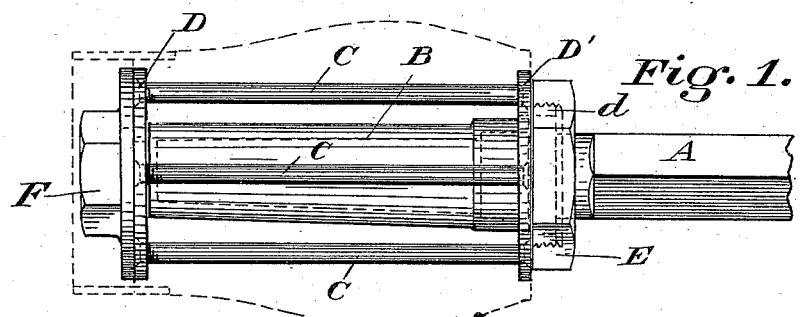
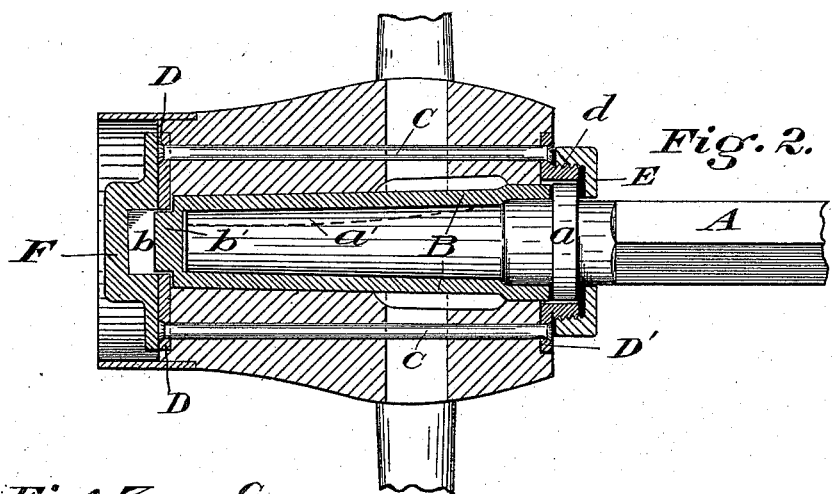
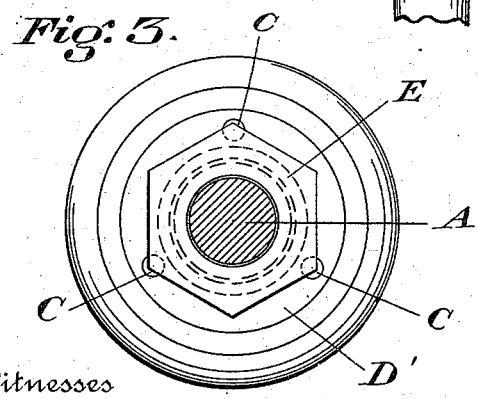
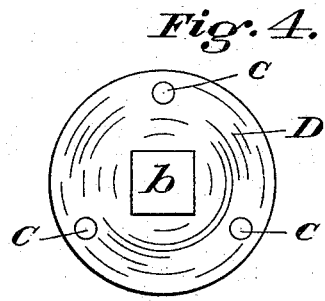
Witnesses
J. Magruder Tubman
H. C. Brooke
Oliver P Jervis Inventor
By his Attorney
Thomas Mackenzie

UNITED STATES PATENT OFFICE.

OLIVER P. JERVIS, OF BALTIMORE, MARYLAND, ASSIGNOR OF ONE-HALF TO THOMAS MACKENZIE AND COSMO T. MACKENZIE, OF SAME PLACE.

WHEEL-FASTENER AND AXLE-BOX.

SPECIFICATION forming part of Letters Patent No. 470,409, dated March 8, 1892.

Application filed October 22, 1891. Serial No. 409,505. (No model.)

*To all whom it may concern:*

Be it known that I, OLIVER P. JERVIS, a citizen of the United States, residing in Baltimore city, in the State of Maryland, have invented a certain new and useful Improvement in Wheel-Fasteners and Axle-Boxes, of which the following is a specification.

My invention relates to improvements in wheel-fasteners for carriages and wagons; and the object of the invention is to provide an improved wheel-fastener so constructed as to effectually confine a lubricating-oil within the box and exclude therefrom sand and dirt. I attain these objects by the mechanism illustrated in the accompanying drawings, in which—

Figure 1 represents a side view of the axle with box, plates, bolts, and nut. Fig. 2 is a sectional view of the wheel-hub in position on the axle. Fig. 3 is an inner end view of the wheel-hub, the axle being in section. Fig. 4 shows the plate which is fastened upon outer end of hub with a square hole, into which fits the square end of the box upon the spindle.

A designates the axle, provided with a thick collar $a$ and with an oil-chamber $a'$ cut in top of axle; B, the box; C, the bolts which pass through the hub and hold upon each end thereof the plates D and D'. The outer plate D is provided with a square hole $b$. The inner plate D' has a circular hole $c$ with a screw-threaded flange $d$.

E designates a nut upon the axle and which turns freely thereon and screws on the flange $d$ of the inner plate. These nuts are placed upon the axles before the two arms composing each axle are welded together, and when the nuts are screwed on flange $d$ they fit snugly over the collar $a$ and hold the wheel to its place upon the spindle.

The box B fits in the hub, as usual, and its outer end is closed, as shown in Fig. 2, and said end is provided with a square head $b'$, which fits in the square hole $b$ in the outer plate D, and thereby is prevented from turning in the hub. An ornamental cap F closes the outer end of the hub, and may be attached by screws or in any other suitable manner. This cap has no special function in the operation of the device, and may be used or omitted.

I am aware that prior to my invention devices have been employed which hold wheels in place on the axle by engagement at the inner end of the hub; but I am not aware of any constructed in the simple manner here indicated.

By this invention I accomplish the object stated and also prevent the box from turning in the hub. The wheel may be attached and detached from the axle-arm by simply turning the nut E onto and off the flange $d$. These flanges and the nuts should be threaded either right or left to suit the side of the vehicle on which they are to be used.

Having described my invention, I claim—

1. The combination of an axle having a fixed collar $a$, a wheel-hub having at its outer end a plate D, at its inner end a plate D', provided with a circular hole and a screw-threaded flange $d$, bolts C, connecting the said outer and inner plates, and a nut E, turning freely on the axle and fitting over the said fixed collar and screwed on the flange of the inner plate.

2. The combination of an axle having a fixed collar $a$, a wheel-hub having at its outer side a plate D, provided with a square hole $b$, at its inner end a plate D', provided with a circular hole and a screw-threaded flange $d$, bolts C, connecting the said outer and inner plates, an axle-box having its outer end closed and provided with a square head $b'$, and a nut E, turning freely on the axle and fitting over the said fixed collar and screwed on the flange of the inner plate.

OLIVER P. JERVIS.

Witnesses:
S. MAGRUDER TUBMAN,
W. C. BROOKE.